US012588649B2

(12) United States Patent
Mu et al.

(10) Patent No.: US 12,588,649 B2
(45) Date of Patent: Mar. 31, 2026

(54) CAT LITTER AND THE PREPARATION METHOD THEREOF

(71) Applicant: ShenZhen YUTO Packaging Technology Co., Ltd., Shenzhen (CN)

(72) Inventors: Zhengyang Mu, Shenzhen (CN); Guocheng Han, Shenzhen (CN); Yanfei Cheng, Shenzhen (CN); Yao Peng, Shenzhen (CN); Wei He, Shenzhen (CN); Wenxiu Li, Shenzhen (CN); Rui Guo, Shenzhen (CN); Mengyao Li, Shenzhen (CN)

(73) Assignee: ShenZhen YUTO Packaging Technology Co., Ltd., Shenzhen (CN)

( * ) Notice: Subject to any disclaimer, the term of this patent is extended or adjusted under 35 U.S.C. 154(b) by 27 days.

(21) Appl. No.: 18/096,543

(22) Filed: Jan. 12, 2023

(65) Prior Publication Data

US 2023/0276766 A1 Sep. 7, 2023

(30) Foreign Application Priority Data

Mar. 7, 2022 (CN) .......................... 202210222748.0

(51) Int. Cl.
A01K 1/015 (2006.01)

(52) U.S. Cl.
CPC .......... A01K 1/0155 (2013.01); A01K 1/0154 (2013.01)

(58) Field of Classification Search
CPC ... A01K 1/0152; A01K 1/0154; A01K 1/0155
See application file for complete search history.

(56) References Cited

U.S. PATENT DOCUMENTS

| | | | | | |
|---|---|---|---|---|---|
| 4,736,706 A | * | 4/1988 | Lang | .................... | A01K 1/0152 |
| | | | | | 119/173 |
| 5,176,108 A | * | 1/1993 | Jenkins | ................ | A01K 1/0154 |
| | | | | | 119/173 |
| 5,188,064 A | * | 2/1993 | House | .................. | A01K 1/0154 |
| | | | | | 119/172 |
| 5,207,830 A | * | 5/1993 | Cowan | ............... | B01J 20/28016 |
| | | | | | 428/404 |
| 6,662,749 B1 | * | 12/2003 | Wiedenhaft | .......... | A01K 1/0155 |
| | | | | | 119/172 |
| 2005/0145186 A1 | * | 7/2005 | Fung | .................... | A01K 1/0155 |
| | | | | | 119/171 |
| 2007/0289543 A1 | * | 12/2007 | Petska | .................. | A01K 1/0154 |
| | | | | | 119/173 |
| 2008/0022940 A1 | * | 1/2008 | Kirsch | ................. | A01K 1/0152 |
| | | | | | 119/173 |
| 2008/0132632 A1 | * | 6/2008 | Schiraldi | ................. | C08L 29/04 |
| | | | | | 524/445 |
| 2017/0196193 A1 | * | 7/2017 | Cross | .................... | A01K 1/0155 |
| 2023/0053770 A1 | * | 2/2023 | Schneider | ........... | A01K 1/0152 |
| 2024/0122154 A1 | * | 4/2024 | Ipsilanti | ............... | A01K 1/0154 |

FOREIGN PATENT DOCUMENTS

| | | | | | | |
|---|---|---|---|---|---|---|
| CN | 101342482 A | * | 1/2009 | | | |
| CN | 102350298 B | * | 2/2013 | | | |
| CN | 106342701 A | * | 1/2017 | .......... | A01K 1/0154 |
| CN | 109205553 A | * | 1/2019 | ............ | A01N 59/00 |
| CN | 113875607 A | * | 1/2022 | | | |
| EP | 0453414 A1 | * | 10/1991 | | | |
| EP | 0744125 A2 | * | 11/1996 | | | |

OTHER PUBLICATIONS

Machine translation of CN 101342482 A. (Year: 2025).*

* cited by examiner

*Primary Examiner* — Peter M Poon
*Assistant Examiner* — Hae Rie Jessica Byun
(74) *Attorney, Agent, or Firm* — Arch & Lake LLP; Hao Tan; Shen Wang

(57) ABSTRACT

A type of cat litter and its preparation method are provided. The content of this cat litter is calculated according to parts by mass and includes the following components: 100 parts of plant fiber waste, 1-7 parts of bacteriostat, 1-34 parts of deodorant, 1-27 parts of agent, 1-47 parts of binder, 1-94 parts of water-absorbing agent and 20-80 parts of water, wherein the bacteriostatic agent includes a mesoporous solid base.

10 Claims, 1 Drawing Sheet

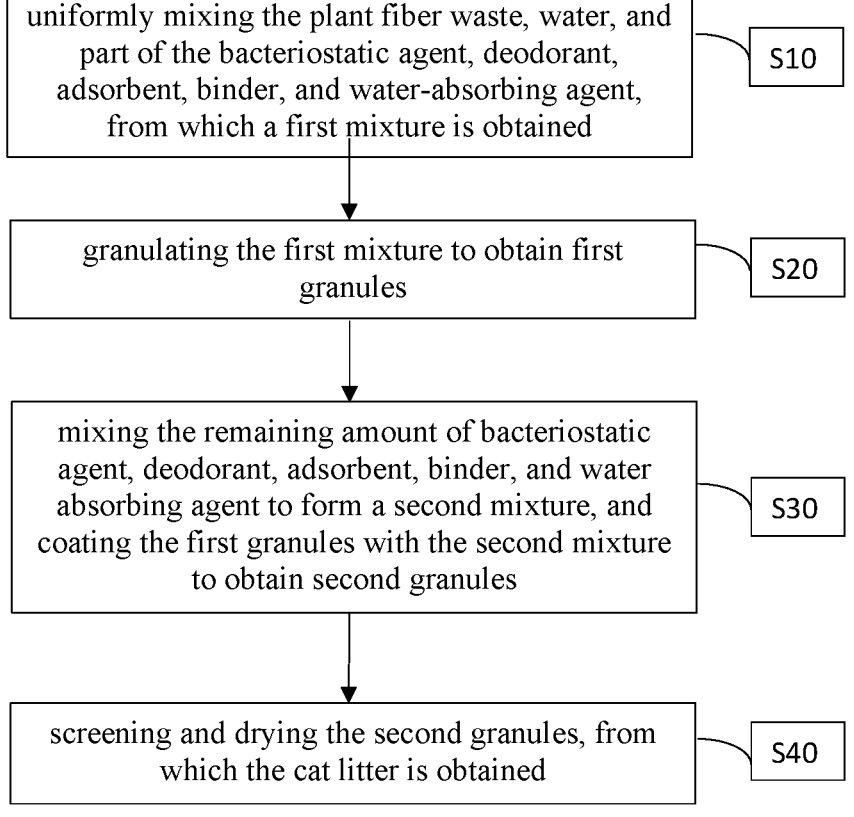

CAT LITTER AND THE PREPARATION METHOD THEREOF

CROSS-REFERENCE TO RELATED APPLICATION

This application is based upon and claims priority to Chinese Patent Application No. 202210222748.0, filed on Mar. 7, 2022, the entire content of which is incorporated herein by reference for all purposes.

TECHNICAL FIELD

The application relates to the technical field of cat litter, in particular to a type of cat litter and the preparation method thereof.

BACKGROUND

Cat litter refers to a type of material used to clean up pet excrement. This material can quickly absorb the urine and feces fluid from pets and the resulting odor, making the breeding environment clean and fresh. In the process of cleaning up pet excrement, if the cat litter is not replaced for a long time, bacteria can easily grow in the cat litter, which is not conducive to the healthy growth of pets.

SUMMARY

The present application provides a type of cat litter and the preparation method thereof.

According to a first aspect of the present disclosure, a cat litter is provided, the cat litter including: 100 parts by mass of plant fiber waste; 1-7 parts by mass of bacteriostatic agent, wherein the bacteriostatic agent comprises a mesoporous solid base; 1-34 parts by mass of deodorant; 1-27 parts by mass of adsorbent; 1-47 parts by mass of binder; 1-94 parts by mass of water-absorbing agent; and 20-80 parts by mass of water, where the parts by mass are calculated compared to mass of the plant fiber waste.

According to a second aspect of the present disclosure, a preparation method of the cat litter is provided, the method including: uniformly mixing plant fiber waste, water, and part of bacteriostatic agent, deodorant, adsorbent, binder, and water-absorbing agent, to obtain a first mixture; granulating the first mixture to obtain first granules; mixing remaining amount of bacteriostatic agent, deodorant, adsorbent, binder, and water-absorbing agent to form a second mixture, and coating the first granules with the second mixture to obtain second granules; and screening and drying the second granules to obtain the cat litter.

It is to be understood that the foregoing general description and the following detailed descriptions are exemplary and explanatory only and are not restrictive of the disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 1 is a schematic flow chart of the preparation method of cat litter provided by some examples of the present disclosure.

DETAILED DESCRIPTION

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Unless otherwise specified, all technical and scientific terms used herein have the same meaning as commonly understood by those skilled in the technical field of the application; the terms used herein are only for the purpose of describing specific embodiments, and are not intended to limit the application; the terms "comprising" and "having" and any variations thereof in the description and claims of this application are intended to cover a non-exclusive inclusion.

In the description of this application, technical terms such as "first" and "second" are only used to distinguish different objects and cannot be understood as indicating or implying relative importance or implicitly indicating the quantity, specific order, or primary and secondary relationship. In the description of the present application, "plurality" means two or more, unless otherwise specifically defined.

In the description of this specification, descriptions that refer to the terms "one embodiment", "some embodiments", "exemplary embodiments", "exemplary", "specific examples", or "some examples" are meant to be combined with the specific features, structures, materials, or characteristics described in the embodiments or examples are included in at least one embodiment or example of the present application. In this specification, schematic representations of the above terms do not necessarily refer to the same embodiment or example. Furthermore, the described specific features, structures, materials, or characteristics may be combined in any suitable manner in any one or more embodiments or examples.

In order to solve the problem of easy breeding of bacteria in the cat litter caused by not changing the cat litter for a long time, bacteriostatic agents are usually added to the raw materials for the preparation of the cat litter to inhibit the growth of bacteria. However, the antibacterial effect of state-of-the-art cat litter is still poor, which affects the health of pets.

The present application provides a type of cat litter, which comprises the following components in terms of parts by mass: plant fiber waste, bacteriostat, deodorant, adsorbent, binder, water-absorbing agent, and water. Among them, 100 parts of plant fiber waste, 1-7 parts of bacteriostatic agent, 1-34 parts of deodorant, 1-27 parts of adsorbent, 1-47 parts of binder, 1-94 parts of water-absorbing agent 20-80 parts of water and 20 parts.

In the present application, by rationally selecting the components and their contents, the cat litter has a better antibacterial effect, so as to benefit the healthy growth of pets. Among them, plant fiber waste is easy to obtain, and after recycling, it can not only reduce the preparation cost of cat litter but also contribute to environmental protection. Moreover, the mesoporous solid base included in the bacteriostatic agent has a larger specific surface area and pore volume, therefore, it has a better bacteriostatic effect.

In the example of the present application, the plant fiber waste is easy to obtain, thereby reducing the difficulty of preparing cat litter. Recycling waste plant fibers reduces the preparation cost of cat litter and is environmentally friendly.

In the examples described below, unless otherwise specified, the parts by mass of the components contained in the cat litter are all relative to 100 parts by mass of plant fiber waste.

Plant Fiber Waste

Plant fiber waste plays a supporting role in the cat litter granulation process. In some examples of the present application, the plant fiber waste may be selected from at least one from the group of bagasse fiber, bamboo fiber, giant fungus grass fiber, straw fiber, eulaliopsis binata fiber, and bamboo shoot shell fiber. The above-mentioned plant fiber wastes are easy to obtain and have high fiber content and good water absorption, so they can not only play a better supporting role during use but also further improve the water absorption effect of cat litter.

Bacteriostatic Agent

Bacteriostatic agents can quickly kill bacteria, fungi, and other microorganisms, making cat litter less likely to breed bacteria during use. In the example of the present application, the bacteriostatic agent includes a mesoporous solid base, wherein "mesoporous" refers to a pore with a pore diameter ranging from 2 nm to 50 nm. Mesoporous solid bases can be used as catalysts. This catalyst has the advantages such as possessing a high activity and requiring mild reaction conditions, and can quickly adsorb oxygen and water vapor in the air on the surface of mesoporous solid bases. Through its own catalytic performance, it can catalyze oxygen and water vapor, which generates oxidative particles such as hydroxyl radicals, oxygen free radicals, and peroxyl radicals. The oxidation rate of these oxidative particles is several orders of magnitude higher than that of ozone, which can quickly kill microorganisms such as bacteria and fungi.

In some examples of the present application, the mesoporous solid base can be selected from metal oxides and/or metal hydroxides. Further, the metal may be an alkali metal or an alkaline earth metal.

Exemplarily, the mesoporous solid base can be at least one of silicon oxide, zirconium oxide, aluminum oxide, magnesium hydroxide, calcium oxide, strontium oxide, barium oxide, and hydrotalcite.

In some examples of the present application, in addition to the mesoporous solid base, the bacteriostatic agent may also include at least one of nano oxides, solid oxychlorides, sorbic acid, and sorbate.

Exemplarily, the nano oxide is selected from at least one of nano-zinc oxide particles, nano-titanium dioxide particles, and nano-ceria particles. The sorbate is selected from at least one of sodium sorbate and potassium sorbate. The solid oxychlorides are selected from chlorine dioxide.

Deodorant

The deodorant can remove ammonia and ammonium ions in pet excrement, thereby improving the air quality and anti-odor in the breeding environment, reducing the occurrence of respiratory diseases in pets, and benefiting the healthy growth of pets. Moreover, the deodorant also has other effects, such as refreshing the body to stop bleeding, avoiding the temperature drop of pets caused by the humid environment, and reducing the incidence of diarrhea and other diseases.

In some examples of the present application, the deodorant is selected from at least one from the group consisting of clay, resin, plant essential oil, and allophane.

In the above-mentioned examples, the clay may be modified clay, and the modified clay may be selected from attapulgite and/or nano-montmorillonite modified with amide compounds.

In some optional examples of the present application, the modified clay is attapulgite modified with amide compounds.

Specifically, the amide compound can be polyacrylamide, which is a linear water-soluble polymer flocculant, and its molecular chain has amide groups with the same number of acrylamide units, and the amide groups have high polarity, easy-to-form hydrogen bonding, and high reactivity.

Attapulgite is a magnesium-rich aluminum silicate clay mineral with a fibrous or chain structure. There are a series of crystal channels in its crystal structure, and its specific surface area is large, which makes it have strong physical adsorption capacity. In addition, due to the existence of crystal defects and vacancies in the crystal structure, the surface of attapulgite is negatively charged, so it has a strong ion exchange adsorption capacity.

In addition, the surface of attapulgite contains a large number of silanol groups, which have a strong affinity for organic matter. Through grafting reactions, organic-inorganic composite materials with certain groups can be generated, thus endowing attapulgite with new properties.

In some examples of the present application, acrylamide can be grafted on the surface of silanized attapulgite to form a polyacrylamide/attapulgite composite material. The surface of the composite material contains a large number of amide groups, which are harmful to heavy metal ions and ammonium ions have a strong adsorption capacity. Moreover, attapulgite itself has a strong adsorption capacity, which can absorb harmful gases in the environment to achieve the purpose of improving the air quality and anti-odor in the breeding environment, thereby reducing the occurrence of pet respiratory diseases and benefiting the healthy growth of pets.

In these above-mentioned examples, the preparation method of the polyacrylamide/attapulgite composite material is:

(1) add 100 mL of toluene, 1 mL of water, and 3.0 g of attapulgite (dried at 105° C. for 2 h) in sequence in a three-necked flask, then add 3 mL of γ-(methacryloyloxy)propyltrimethoxysilane while stirring (KH-570), and heat the mixture with ultrasound at 40° C. to 45° C. for 40 min;

(2) when stirring, let the mixture react at a constant temperature between 45° C. and 50° C. for 4 hours; after filtering the product of reaction, wash the resulting product with toluene, absolute ethanol, and deionized water in order to remove the excess KH-570; dry the resulting product at 105° C. to obtain silanized attapulgite, which is grounded and sieved for later use, wherein the 200 mesh is used for sieving;

(3) add 100 mL of toluene and 2.0 g of silanized attapulgite into the three-necked flask in turn, and then add a certain mass of acrylamide and azobisisobutyronitrile (AIBN) in turn, and let the mixture react under the protection of nitrogen and at a certain temperature;

(4) after the reaction is over, the obtained product is filtered and washed with toluene, absolute ethanol and deionized water in order to remove excess polyacrylamide to obtain a polyacrylamide/attapulgite composite material, and the composite material was dried at 105° C., ground and sieved for later use, wherein the 200 mesh was used for sieving.

In other examples of the present application, the deodorant can be selected from super absorbent resins, which include hydrophilic functional groups such as carboxyl, sulfonic acid, hydroxyl, and amide groups, which can absorb dozens to thousands of times of water equivalent to its own weight and start to swell to form a hydrogel after contact with water or aqueous solution, wherein the hydrogel can absorb ammonia gas, thus having an obvious deodorizing effect. Exemplarily, the superabsorbent resin may be poly-acrylic acid. Deodorant can also be zeolite powder.

Adsorbent

Adsorbents are used to remove highly toxic, teratogenic, and carcinogenic metabolites produced by fungi or molds. Among them, mycotoxins can cause growth retardation, decreased immunity, and organ dysfunction in pets.

In some examples of the present application, the adsorbent is selected from at least one in the group consisting of activated carbon, a mixture of water and calcium sodium aluminosilicate, diatomaceous earth, esterified glucomannan, and cholestyramine.

Binder

The binder is what holds the components together to form a granulated mass during the litter granulation process. In some examples of the present application, the binder is selected from at least one of whey protein, sodium alginate, zein, sodium bentonite, carboxymethyl cellulose, sodium polyacrylate, pregelatinized starch, and jelly glue.

Absorbent

The water-absorbing agent has excellent water-absorbing properties and the ability to retain moisture. In some examples of the present application, the water-absorbing agent is selected from the group consisting of acrylate polymers, acrylonitrile copolymers, proteins, thermosetting resins, and barrier resins.

Exemplary, the acrylate polymer can be polyacrylate or starch acrylate polymer; the acrylonitrile copolymer can be starch-acrylonitrile graft copolymer or acrylamide-acrylonitrile-acrylic acid terpolymer; the protein can be casein; the thermosetting resin can be polyamide epichlorohydrin; and the barrier resin can be polyvinyl alcohol.

In some examples of the present application, calculated according to parts by mass, the following components are included: 2 to 6 parts of bacteriostatic agent; and/or, 3 to 30 parts of deodorant; and/or, 2-25 parts of absorbent; and/or, 5-40 parts of binder; and/or, 3-85 parts of water-absorbing agent; and/or, 26-60 parts of water.

In the above-mentioned examples, the content of each component is further optimized so that the cat litter has a better antibacterial effect, so as to facilitate the healthy growth of pets.

In some examples of the present application, calculated by parts by mass, the cat litter further includes the following components: a fiber softener, wherein the content of the fiber softener relative to 100 parts by mass of plant fiber waste is 1-18 parts by mass.

In the above-mentioned examples, the fiber softener can improve the softness of the cat litter, so as to achieve the purpose of making the cat litter feel soft and comfortable.

In some examples of the present application, the fiber softener is selected from at least one of fatty acid compounds, fatty acid ester compounds, glycerin compounds, amide compounds, and silicone oil compounds.

Exemplarily, the fiber softener can be one or more of glyceryl monostearate, stearic acid, oleic acid amide, glycerin, trialkyl phosphate, amino silicone oil, and pentaerythritol stearate mixture.

In some examples of the present application, calculated by parts by mass, the cat litter further includes the following components: refreshing agent, wherein the content of the refreshing agent is 1 to 13 parts by mass relative to 100 parts by mass of plant fiber waste.

In the above-mentioned examples, the refreshing agent can absorb the peculiar smell in the pet excrement, further improve the air quality in the breeding environment, and benefit the healthy growth of pets.

In some examples of the present application, the refreshing agent is selected from apple wood fibers. The apple wood fiber has a slightly sweet smell when processed, and the natural fruit wood is non-irritating, green, environmentally friendly, fresh, and dust-free.

In some examples of the present application, calculated according to parts by mass, the following components are included: 3 to 6 parts of the bacteriostatic agent; and/or, 6 to 12 parts of the deodorant; and/or, 3-4 parts of absorbent; and/or, 11-17 parts of binder; and/or, 5-9 parts of the water-absorbing agent; and/or, 41-56 parts of water; and/or, 2-6 parts of the fiber-softening agent; and/or 4-9 parts of the refreshing agent.

In the above-mentioned examples, the content of each component is further optimized, so that the cat litter has not only a better antibacterial effect and deodorizing effect, but also improved softness, which is more conducive to the healthy growth of pets.

The application also provides a preparation method for cat litter as in any one of the above examples, as illustrated in FIG. 1. The preparation method includes the steps of:

S10: uniformly mixing the plant fiber waste, water, and part of the bacteriostatic agent, deodorant, adsorbent, binder, and water-absorbing agent, from which a first mixture is obtained;

S20: granulating the first mixture to obtain first granules;

S30: mixing the remaining amount of bacteriostatic agent, deodorant, adsorbent, binder, and water absorbing agent to form a second mixture, and coating the first granules with the second mixture to obtain second granules;

S40: screening and drying the second granules, from which the cat litter is obtained.

In the present application, each component of the cat litter is easy to obtain, therefore, the difficulty and cost of preparation are both low.

In some examples of the present application, S10 includes the following steps:

S11: sequentially sorting and drying the plant fiber waste to obtain the required cat litter components;

S12: spraying water evenly into the dried plant fiber waste, stirring to mix the water and dried plant fiber waste;

S13: adding part of the binder, bacteriostatic agent, deodorant, and adsorbent to the mixture obtained in S12, and stirring for 5 min to 10 min;

S14: adding part of the water-absorbing agent to the mixture obtained in S13, and stirring for 3 minutes to 5 minutes.

In some examples of the present application, S20 includes the following steps:

S21: slowly adding the mixture obtained in S14 into the mold of the granule manufacturing machine, to obtain the first granules after extrusion.

In some examples of the present application, the compression package of the mold is 0.5 to 2.5. When the compression ratio is within the above range, the porosity, formability, and integrity of the first granules can be improved, and the formability and integrity can be balanced. The high porosity can not only make the cat litter have a better softness and water absorption effect but also make each cat litter absorb water faster and more fully, so as to save the amount of cat litter and prevent cat urine leakage. The high formability and high integrity result in lower levels of fines and dust in cat litter.

In some examples of the present application, S30 includes the following steps:

S31: when stirring, adding the remaining amount of bacteriostatic agent, deodorant, adsorbent, binder, and water-absorbing agent to the first granule until the wrapping is completed, and continuing the stirring for 3 minutes to 5 minutes to obtain the second granule.

In some examples of the present application, S40 includes the following steps:

S41: sieving the second granules through a 40-mesh filter, transferring the second granules on the filter to a drying device for drying treatment, wherein the drying temperature is 65° C. to 75° C. and the drying time is 15 min to 25 min, and the controlled cat litter can be obtained when the moisture content of the granules is between 12% and 18%.

In some examples of the present application, the preparation method of cat litter comprises the steps:

(1) sorting and drying the plant fiber waste and refreshing agent, and then mixing the plant fiber waste and refreshing agent evenly to obtain mixed fibers;

(2) adding fiber softener evenly to the mixture obtained in (1), stirring for 5 to 10 minutes, and then letting the mixture stand for 20 to 30 minutes;

(3) spraying water evenly into the mixed fibers obtained in step (2), and stirring until evenly mixed;

(4) mixing and adding part of the bacteriostatic agent, deodorant, adsorbent, binder, and water absorbent to the mixture obtained in step (3), and stirring for 5 to 10 minutes;

(5) adding part of the water-absorbing agent to the mixture obtained in step (4), and stirring for 3 to 5 minutes;

(6) slowly adding the mixture obtained in step (5) into the mold of the granule manufacturing machine, adjusting the compression ratio of the mold to 0.5 to 2.5, and obtaining the first granules by extrusion;

(7) heating the water to 50° C. to 60° C., and then adding pregelatinized starch with a concentration of 2% to the water under stirring conditions to obtain a pregelatinized starch solution, wherein the stirring speed is 600 r/min to 1400 r/min, the stirring time is 5 min to 10 min;

(8) putting the first granule into the powder coating machine and adding the pregelatinized starch solution in (7) under the condition of stirring; adding the binding agent and the water-absorbing agent to the powder coating machine to coat the second granules; and continuing to stir for 3 to 5 minutes to obtain the second granules;

(9) sieving the second granules through a 40-mesh filter, transferring the second granules on the filter to the drying equipment for drying treatment, wherein the drying temperature is 65° C. to 75° C., the drying time is 15 min to 25 min, and the moisture content of the granules is controlled at 12% to 18%.

The cat litter of the present application and its preparation method are described in detail below by specific examples.

Example 1

The present example provides a kind of preparation method for cat litter, comprising the steps:

(1) sorting and drying the plant fiber waste in order to obtain the required cat litter components;

(2) spraying water evenly into the dried plant fiber waste, and stirring to mix;

(3) adding 1.5 parts of binder, 0.3 parts of bacteriostatic agent, 0.5 parts of deodorant, and 0.8 parts of adsorbent to the mixture obtained in step (2), and stirring for 5 minutes;

(4) adding 1 part of the water-absorbing agent to the mixture obtained in step (3), and stirring for 3 minutes;

(5) slowly adding the mixture obtained in step (4) into the mold of the granule manufacturing machine, and obtaining the first granules after extrusion, wherein the compression ratio of the mold is 2.5;

(6) putting the first granule into the powder-coating machine, and adding the remaining amount of bacteriostat, deodorant, adsorbent, binder, and water-absorbing agent into the powder-coating machine under stirring conditions to coat the second granules, and continuing to stir for 3 minutes to obtain the second particle;

(7) passing the second particle through a 40-mesh filter, transferring the second particle on the filter to the drying equipment for drying treatment, wherein the drying temperature is 65° C. and the drying time is 15 minutes, and the moisture content of the particles is controlled at 18% to obtain cat litter.

Example 2

The present example provides a kind of preparation method for cat litter, comprising the steps:

(1) sorting and drying the plant fiber waste and refreshing agent, and then mixing the plant fiber waste and refreshing agent evenly;

(2) adding fiber softener evenly to the mixture obtained in (1), stirring for 8 minutes, and then letting it stand for 25 minutes;

(3) spraying water evenly into the mixture obtained in step (2), and stirring until evenly mixed;

(4) adding 4 parts of binder, 1 part of bacteriostatic agent, 2.5 parts of deodorant, and 1.5 parts of adsorbent to the mixture obtained in step (3), and stirring for 8 minutes;

(5) adding 2 parts of water-absorbing agent to the mixture obtained in step (4), and stirring for 4 minutes;

(6) slowly adding the mixture obtained in step (5) into the mold of the granule manufacturing machine, and extruding to obtain the first granules, wherein the compression ratio of the mold is 1.5;

(7) heating the water to 65° C., and then adding pregelatinized starch with a concentration of 2% to the water under stirring conditions to obtain a pregelatinized starch solution, wherein the stirring speed is 900 r/min and the stirring time is 7 min;

(8) putting the first granule into the powder coating machine, adding the pregelatinized starch solution in (7) under the condition of stirring, adding the binding agent and the water-absorbing agent to the powder coating machine to coat the second granules, and continuing the stir for 4 minutes to obtain the second granules;

(9) sieving the second granules through a 40-mesh filter, transferring the second granules on the filter to the drying equipment for drying treatment, wherein the drying temperature is 70° C., the drying time is 20 minutes, and the moisture content of the particles is controlled at 15%.

Example 3

The present example provides a kind of preparation method for cat litter, comprising the steps:

(1) sorting and drying the plant fiber waste and refreshing agent, and then mixing the plant fiber waste and refreshing agent evenly;

(2) adding fiber softener evenly to the mixture obtained in (1), stirring for 10 minutes, and then letting it stand for 30 minutes;

(3) spraying water evenly into the mixture obtained in step (2), and stirring until the mixture is evenly mixed;

(4) adding 8 parts of binder, 3 parts of bacteriostatic agent, 4.5 parts of deodorant, and 2 parts of adsorbent to the mixture obtained in step (3), and stirring for 10 minutes;

(5) adding 4.5 parts of water-absorbing agent to the mixture obtained in step (4), and stirring for 5 minutes;

(6) slowly adding the mixture obtained in step (5) into the mold of the granule manufacturing machine, and extruding to obtain the first granules, wherein the compression ratio of the mold is 0.5;

(7) heating the water to 60° C., and then adding pregelatinized starch with a concentration of 2% to the water under stirring conditions to obtain a pregelatinized starch solution, wherein the stirring speed is 1400 r/min and the stirring time is 10 min;

(8) putting the first granules into the powder coating machine, adding the pregelatinized starch solution in (7) under the condition of stirring, adding the binding agent and the water-absorbing agent to the powder coating machine to coat the second granules, and continuing to stir for 5 minutes to obtain the second granules;

(9) sieving the second granules through a 40-mesh filter, transferring the second granules on the filter to the drying equipment for drying treatment, wherein the drying temperature is 75° C., the drying time is 25 minutes, and the moisture content of the particles is controlled at 12%.

Comparative Example 1

The present example provides a kind of preparation method for cat litter, comprising the steps:

(1) sorting and drying plant fiber waste;

(2) adding fiber softener evenly to the plant fiber waste obtained in (1), stirring for 5 minutes, and then letting the mixture stand for 20 minutes;

(3) spraying water evenly into the mixture obtained in (2), and stirring until evenly mixed;

(4) adding 0.2 parts of bacteriostatic agent, 8 parts of binder, and 4.5 parts of water absorbent to the mixture obtained in step (3), and stirring for 5 minutes;

(5) slowly adding the mixture obtained in step (4) into the mold of the granule manufacturing machine, and extruding to obtain the first granule, wherein the compression ratio of the mold is 3.0;

(6) heating the water to 50° C., and then adding pregelatinized starch with a concentration of 2% to the water under stirring conditions to obtain a pregelatinized starch solution, wherein the stirring speed is 600 r/min and the stirring time is 5 min;

(7) putting the first granule into the flour coating machine, adding the pregelatinized starch solution in (6) under stirring condition, after the addition is completed, adding the remaining bacteriostatic agent, binder and water absorbent to carry out the coating treatment to the second granule in the powder coating machine, and continuing stirring for 3 minutes to obtain the second granule;

(8) passing the second granules through a 40-mesh filter, transferring the second granules on the filter to the drying equipment for drying treatment, wherein the drying temperature is 65° C., the drying time is 15 minutes, and the moisture content of the particles is controlled at 18%.

The mass ratios of the components in the cat litter of Examples 1-3 and Comparative Example 1 are shown in Table 1.

TABLE 1

| Example | Component | Specific Components | Part(s) by Mass |
|---|---|---|---|
| Example 1 | plant fiber waste | bagasse fiber | 90 |
| | | straw fiber | 10 |
| | bacteriostatic agent | mesoporous silica solid base | 1 |
| | | nano titanium dioxide | 1 |
| | deodorant | allophane | 3 |
| | adsorbent | diatomaceous earth | 2 |
| | binder | carboxymethyl cellulose | 5 |
| | water-absorbing agent | polyvinyl alcohol | 3 |
| | water | water | 26 |
| Example 2 | plant fiber waste | bagasse fiber | 87 |
| | | bamboo shoot fiber | 13 |
| | bacteriostatic agent | mesoporous alumina solid base | 2 |
| | | potassium sorbate | 1 |
| | deodorant | polyacrylamide/attapulgite | 4 |
| | | super absorbent resin | 2 |
| | adsorbent | water and calcium sodium aluminosilicate | 3 |
| | binder | sodium alginate | 11 |
| | water-absorbing agent | starch acrylate polymer | 5 |
| | water | water | 41 |
| | refreshing agent | applewood fiber | 4 |
| | fiber softener | amino silicone oil | 2 |

TABLE 1-continued

| Example | Component | Specific Components | Part(s) by Mass |
|---|---|---|---|
| Example 3 | plant fiber waste | bagasse fiber | 89 |
| | | bamboo fiber | 11 |
| | bacteriostatic agent | mesoporous zirconia solid base | 5 |
| | | nano zinc oxide | 1 |
| | deodorant | modified montmorillonite | 7 |
| | | super absorbent resin | 4 |
| | adsorbent | esterified glucomannan | 4 |
| | binder | pregelatinized starch | 17 |
| | water-absorbing agent | starch-acrylonitrile graft copolymer | 9 |
| | water | water | 56 |
| | refreshing agent | applewood fiber | 9 |
| | fiber softener | glycerin | 4 |
| | | glyceryl monostearate | 2 |
| Comparative Example 1 | plant fiber waste | bagasse fiber | 89 |
| | | bamboo fiber | 11 |
| | bacteriostatic agent | nano zinc oxide | 1 |
| | deodorant | pregelatinized starch | 17 |
| | water-absorbing agent | starch-acrylonitrile graft copolymer | 9 |
| | water | water | 56 |
| | fiber softener | glycerin | 4 |
| | | glyceryl monostearate | 2 |

Test Case

After carrying out a performance test on the cat litter in Examples 1 to 3 and Comparative Example 1, the test result is as shown in Table 2, and the specifics of the performance test are as follows:

Agglomeration Strength

The sample absorbs water and coagulates to form a clumped sample. The experimenter drops the clumped sample from a certain height and judges its clumping strength by looking at its broken state. When the clumping strength is greater than or equal to 75%, it is qualified.

Test procedure: randomly take a clumping sample, weigh the clumping grammage m1 (clustering grammage refers to the weight of the sample after absorbing water and condensing into a clumping), then freely drop it from a height of 50 cm to a marble or other inelastic tabletop, pick up the largest cat litter mass, which is weighed in m2, and the formula for calculating the mass strength is as follows:

$$Q=m1/m2\times100\%$$

In the formula:

Q—agglomeration strength, unit is %;

m1—agglomerate gram mass, the unit is g;

m2—agglomeration mass, the unit is g.

Water Absorption

When the water absorption rate is greater than or equal to 66%, it is qualified, and the instruments used for the water absorption rate should be as follows:

a) balance, the sensitivity specification is 0.01 g;

b) acid burette, the specification is 25 mL;

c) pipette, the specification is 20 mL.

Test steps: spread 20 g of cat litter in the sample basin, with a thickness of about 8 cm to 10 cm, use a pipette to draw 20 mL of 1% sodium chloride solution at a temperature of 36° C. to 40° C., transfer it to an acid burette, adjust the distance between the acid burette and the sample plane to about 3 cm, open the acid burette, all the solution flows into the sample within 30 s, and after all the solution flows out for 60 s, take out the agglomerated sample and weigh the mass m on a balance with a sensitivity specification of 0.01 g. According to this method, concurrently generate 3 sets of samples to calculate the average value. The calculation formula for water absorption is as follows:

$$X=20/(m1-20)\times100\%$$

In the formula:

X—water absorption, the unit is %;

m1—agglomerate gram mass, the unit is g.

Ammonia Concentration

In a closed environment, use an ammonia detector to measure the residual ammonia concentration after a certain ammonia solution is absorbed. When the ammonia concentration is less than or equal to 20 mg/m3, it is qualified.

Test procedure: preparation concentration is the ammonia solution odor source of 5%, the constant temperature under 23° C. to 27° C., puts in a square and the sealed box together with the test sample together with material cup, and the length of this box is 30 cm, width is 20 cm, the height is 10 cm, and the ammonia measuring instrument is placed 10 cm away from the material cup. Use a pipette-to-pipette 20 mL of the prepared odor source to flow down to the center of the material cup and seal the box. After 3 minutes, the reading value is the ammonia gas concentration.

Bacteria, Mold, and Aflatoxin Content

The content of coliform bacteria is determined according to GB/T 18869. When the content of coliform bacteria is less than or equal to 300 MPN/100 g, the product is qualified.

*Salmonella* content is determined according to GB/T 13091, *Salmonella* content.

The total mold content is determined according to GB/T 13092, and when the total mold content is less than or equal to 4×104 CFU/g, the product is qualified.

The content of aflatoxin B1 is determined according to GB/T 17480. When the content of aflatoxin B1 is less than or equal to 20 μg/kg, the product is qualified.

TABLE 2

| Performance Index | Example 1 | Example 2 | Example 3 | Comparative Example 1 |
|---|---|---|---|---|
| Clumping Strength (%) | 78 | 87 | 95 | 72 |

TABLE 2-continued

| Performance Index | Example 1 | Example 2 | Example 3 | Comparative Example 1 |
|---|---|---|---|---|
| Water Absorption (%) | 72 | 120 | 200 | 68 |
| Ammonia Concentration (mg/m³) | 20 | 3 | 3 | 35 |
| Mold (CFU/g) | 50 | 10 | 3 | $5 \times 10^4$ |
| Coliform Bacteria (MPN/100 g) | 30 | 15 | 5 | 350 |
| *Salmonella* (abs/25 g) | abs | abs | abs | abs |
| Aflatoxin $B_1$ (μg/kg) | 1.5 | 0.5 | 0.1 | 30 |

Note: abs/25 g means that no (abs) *Salmonella* was detected in the 25 g sample, which is qualified.

As can be seen from Table 2, the cat litter of the present application not only has excellent antibacterial effect, but also has good clumping strength, water absorption rate, and deodorizing effect.

The present application provides a type of cat litter and the preparation method thereof. The cat litter has a good antibacterial effect and is beneficial to the healthy growth of pets.

In order to solve the above-mentioned technical problems, the application provides a cat litter, calculated according to parts by mass, comprising the following components: plant fiber waste, 100 parts; bacteriostatic agent, 1-7 parts, wherein, the bacteriostatic agent comprises mesoporous solid base; deodorant, 1-34 parts; adsorbent, 1-27 parts; binder, 1-47 parts; water absorbent, 1-94 parts; water, 20~80 parts.

In the present application, by rationally selecting the components and their contents, the cat litter has a better antibacterial effect, so as to benefit the healthy growth of pets. Among them, the recycling of plant fiber waste can not only reduce the preparation cost of cat litter, but also contribute to environmental protection. Moreover, the mesoporous solid base included in the bacteriostatic agent has a larger specific surface area and pore volume, so that it has better bacteriostatic effect.

In some examples of the present application, calculated in parts by mass, the following components are included: the bacteriostatic agent is 2-6 parts; and/or, the deodorant is 3-30 parts; and/or, the adsorbent is 2-25 parts; and/or, the binder is 5-40 parts; and/or, the water-absorbing agent is 3-85 parts; and/or, the water is 26-60 parts.

In some examples of the present application, calculated according to parts by mass, the cat litter also includes the following components: a fiber softener, the content of the fiber softener relative to 100 parts by mass of the plant fiber waste is 1 to 18 parts by mass.

In some examples of the present application, calculated according to parts by mass, the cat litter also includes the following components: a refreshing agent, the content of the refreshing agent relative to 100 parts by mass of the plant fiber waste is 1 to 13 parts by mass.

In some examples of the present application, calculated in parts by mass, the following components are included: the bacteriostatic agent is 3-6 parts; and/or, described deodorant is 6-12 parts; and/or, the adsorbent is 3-4 parts; and/or, the binder is 11-17 parts; and/or, the water-absorbing agent is 5-9 parts; and/or, the water is 41-56 parts; and/or, the fiber softener is 2-6 parts; and/or, the refreshing agent is 4-9 parts.

In some examples of the present application, the fiber softener is selected from at least one of fatty acid compounds, fatty acid ester compounds, glycerin compounds, amide compounds, and silicone oil compounds; and/or, the refreshing agent is selected from apple wood fiber.

In some examples of the present application, the mesoporous solid base is selected from metal oxides and/or metal hydroxides.

In some examples of the present application, the metal oxide is selected from alkali metal oxides and/or alkaline earth metal oxides; the metal hydroxide is selected from alkali metal hydroxides and/or alkaline earth metal hydroxides.

In some examples of the present application, the plant fiber waste is selected from at least one of bagasse fiber, bamboo fiber, giant fungus grass fiber, straw fiber, eulaliopsis binata fiber, and bamboo shoot shell fiber; and/or, the bacteriostatic agent also includes at least one of nano oxides, solid oxychlorides, sorbic acid and sorbate; and/or, the deodorant is selected from at least one of clay, resin, plant essential oil and allophane; and/or, the adsorbent is selected from at least one of activated carbon, a mixture of water and sodium calcium aluminosilicate, diatomaceous earth, esterified glucomannan and cholestyramine; and/or, the binder is selected from at least one of whey protein, sodium alginate, zein, sodium bentonite, carboxymethyl cellulose, sodium polyacrylate, pregelatinized starch and jelly glue; and/or, the water absorbing agent is selected from at least one of acrylate polymers, acrylonitrile copolymers, proteins, thermosetting resins, and barrier resins.

In some examples of the present application, the nano-oxide is selected from at least one of nano-zinc oxide particles, nano-titanium dioxide particles and nano-ceria particles; the sorbate is selected from at least one of sodium sorbate and potassium sorbate; the solid oxychloride is selected from chlorine dioxide; the clay is modified clay, and the modified clay is selected from attapulgite and/or nano-montmorillonite modified with amide compounds.

The application also provides a method for preparing cat litter as described in any one of the above examples, comprising the steps of: uniformly mixing the plant fiber waste, water and part of the bacteriostatic agent, deodorant, adsorbent, binder, and water-absorbing agent to obtain the first mixture; granulating the mixture to obtain first granules; mixing the remaining amount of bacteriostatic agent, deodorant, adsorbent, binder, and water absorbing agent to form a second mixture, and coating the first granules with the second mixture to obtain second granules; screening and drying second granules to obtain the cat litter.

In some examples of the present application, the compression ratio of the granulation is 0.5 to 2.5.

Other examples of the present disclosure will be apparent to those skilled in the art from consideration of the specification and practice of the present disclosed. This disclosure is intended to cover any variations, uses, or adaptations of the disclosure such departures from the present disclosure as come within known or customary practice in the art. It is intended that the specification and examples be considered as exemplary only, with a true scope and spirit of the present disclosure being indicated by the following claims.

It will be appreciated that that the present disclosure is not limited to the exact construction that has been described above and illustrated in the accompanying drawings, and that various modifications and changes may be made without departing from the scope thereof. It is intended that the scope of the present disclosure only by the appended claims.

The invention claimed is:

1. A cat litter, comprising:

100 parts by mass of plant fiber waste;

1-7 parts by mass of bacteriostatic agent with respect to 100 parts by mass of plant fiber waste, wherein the bacteriostatic agent comprises: a mesoporous solid base comprising at least one of an alkali metal hydroxide or an alkaline earth metal hydroxide;

and at least one of nano oxides, solid oxychlorides, sorbic acid, or sorbate;

6-12 parts by mass of deodorant with respect to 100 parts by mass of plant fiber waste, wherein the deodorant comprises at least one of modified clay, resin, and allophane;

1-27 parts by mass of adsorbent with respect to 100 parts by mass of plant fiber waste;

1-47 parts by mass of binder with respect to 100 parts by mass of plant fiber waste;

5-9 parts by mass of water-absorbing agent with respect to 100 parts by mass of plant fiber waste;

4-9 parts by mass of refreshing agent with respect to 100 parts by mass of plant fiber waste, wherein the refreshing agent comprises apple wood fiber;

2-6 parts by mass of fiber softener with respect to 100 parts by mass of plant fiber waste, wherein the fiber softener comprises at least one of fatty acid ester compounds, glycerol compounds, or amide compounds; and 41-56 parts by mass of water with respect to 100 parts by mass of plant fiber waste, wherein the parts by mass are calculated compared to mass of the plant fiber waste.

2. The cat litter according to claim 1, wherein:

the bacteriostatic agent is 2-6 parts by mass with respect to 100 parts by mass of plant fiber waste;

the adsorbent is 2-25 parts by mass with respect to 100 parts by mass of plant fiber waste; or the binder is 5-40 parts by mass with respect to 100 parts by mass of plant fiber waste.

3. The cat litter according to claim 1, wherein:

the bacteriostatic agent is 3-6 parts by mass with respect to 100 parts by mass of plant fiber waste;

the adsorbent is 3-4 parts by mass with respect to 100 parts by mass of plant fiber waste;

the binder is 11-17 parts by mass with respect to 100 parts by mass of plant fiber waste;

or the fiber softener is 2-6 parts by mass with respect to 100 parts by mass of plant fiber waste.

4. The cat litter according to claim 1, wherein the plant fiber waste is selected from at least one in a group consisting of bagasse fiber, bamboo fiber, giant fungus grass fiber, straw fiber, eulaliopsis binate fiber, and bamboo shoot shell fiber.

5. The cat litter according claim 1, wherein the adsorbent is selected from at least one in a group consisting of activated carbon, a mixture of water and sodium calcium aluminosilicate, diatomaceous earth, esterified glucomannan, and cholestyramine.

6. The cat litter according to claim 1, wherein the binder is selected from at least one in a group consisting of whey protein, sodium alginate, zein, sodium bentonite, carboxymethyl cellulose, sodium polyacrylate, pregelatinized starch, and jelly glue.

7. The cat litter according to claim 1, wherein the water-absorbing agent is selected from at least one in a group consisting of acrylate polymers, acrylonitrile copolymers, proteins, thermosetting resins, and barrier resins.

8. The cat litter according to claim 1, wherein the nano oxides are selected from at least one in a group consisting of nano-zinc oxide particles, nano-titanium dioxide particles, and nano-cerium dioxide particles;

the sorbate is selected from at least one in a group consisting of sodium sorbate and potassium sorbate; and the solid oxychloride comprises chlorine dioxide.

9. The cat litter according to claim 1, wherein the modified clay comprises attapulgite modified with amide compounds or nano-montmorillonite modified with amide compounds.

10. The cat litter according to claim 9, wherein the amide compound is polyacrylamide, and the polyacrylamide is grafted on a surface of silanized attapulgite to form a polyacrylamide/attapulgite composite material.

* * * * *